United States Patent [19]
Wood et al.

[11] Patent Number: 5,360,250
[45] Date of Patent: Nov. 1, 1994

[54] TRUCK BED LINER WITH RAIL PROTECTION

[75] Inventors: Stephen R. Wood; Richard J. Kremer, both of Bloomingdale, Ind.

[73] Assignee: Futurex Industries, Inc., Marshall, Ind.

[21] Appl. No.: 39,980

[22] Filed: Mar. 30, 1993

[51] Int. Cl.$^5$ .............................................. B62D 33/02
[52] U.S. Cl. ...................................... 296/39.2; 296/43
[58] Field of Search ........................ 296/39.1, 39.2, 43; 411/238, 544, 546

[56] References Cited

U.S. PATENT DOCUMENTS

| | | | |
|---|---|---|---|
| 3,814,473 | 6/1974 | Lorenzen, Jr. | 296/39.2 |
| 4,047,749 | 9/1977 | Lambitz et al. | 296/39.2 |
| 4,161,335 | 7/1979 | Nix et al. | 296/39.2 |
| 4,333,678 | 6/1982 | Munoz et al. | 296/39.2 |
| 4,575,146 | 3/1986 | Markos | 296/39.2 |
| 4,595,229 | 6/1986 | Wagner | 296/39.2 |
| 4,750,776 | 6/1988 | Barban | 296/39.2 |
| 4,875,731 | 10/1989 | Ruiz | 296/37.2 |
| 4,906,040 | 3/1990 | Edwards | 296/39.2 |
| 4,944,612 | 7/1990 | Abstetar et al. | 296/39.2 |
| 4,974,895 | 12/1990 | Davenport | 296/39.2 |
| 5,000,503 | 3/1991 | Bernatek | 296/39.2 |
| 5,046,775 | 9/1991 | Marcum, Jr. et al. | 296/39.2 |
| 5,052,737 | 10/1991 | Farmer, Jr. | 296/39.2 |
| 5,137,322 | 8/1992 | Muirhead | 296/39.2 |
| 5,150,940 | 9/1992 | Kennedy | 24/297 X |
| 5,154,478 | 10/1992 | Erickson et al. | 296/39.2 |
| 5,253,918 | 10/1993 | Wood et al. | 296/39.2 |

*Primary Examiner*—Dennis H. Pedder
*Attorney, Agent, or Firm*—Ice Miller Donadio and Ryan

[57] ABSTRACT

A truck bed liner with rail protection which protects the horizontal top rail of a vertical cargo bed wall. The rail protector is integral with an upright surface of the liner and includes an upper portion, a lower portion, and a connecting portion. The upper portion extends away from the cargo bed and is spaced from the top rail. The lower portion is generally horizontal and extends outwardly and is substantially flush with the top rail. A vertically extending connecting portion connects the upper and lower portions and provides increased warpage resistance to the invention. A resilient load-bearing foam member, or a reinforcing plate oriented over a stake pocket and with securing means, is positioned inward of the vertically extending connecting portion and assists in maintaining the lower portion of the rail protector away from the top rail to reduce scuffing and damage to the top rail.

12 Claims, 7 Drawing Sheets

TRUCK BED LINER WITH RAIL PROTECTION

FIELD OF THE INVENTION

This invention relates to vehicle bed liners, and, in particular, to liners having upright surfaces which terminate with generally horizontal flanges which overlay and protect the top rails of a vehicle in which the liner is mounted.

BACKGROUND OF THE INVENTION

During recent years, pickup trucks have gained popularity as a form of family transportation as they are able to transport both passengers and cargo. If the truck is being used to carry cargo, truck bed liners are often installed to protect the metal surfaces of the truck bed from scratches and dents which may lead to rust and which affect the aesthetic appearance of the bed. Some liners, as disclosed in U.S. Pat. No. 4,162,098, protect only the floor of the truck bed; some, as disclosed in U.S. Pat. No. 4,245,863, protect only the side walls of the bed; and most protect the floor, the end wall, both side walls, and the tailgate. Various materials such as wood (U.S. Pat. No. 4,505,508), vinyl (U.S. Pat. No. 4,279,439), and plastic (U.S. Pat. No. 4,693,507), are used in the manufacture of truck bed liners, and some, such as those disclosed in U.S. Pat. Nos. 4,505,508, 4,893,862, 4,944,612 and 4,986,590, are multi-piece liners, while most have a unibody construction. The most common truck bed liner is made of a plastic material formed for a custom fit of various makes and models of pickup trucks.

In addition to protectively covering the interior of the truck cargo bed, many truck cargo bed liners also employ generally horizontal flanges which overlay the top rails of the vertical walls of the truck cargo bed. These protective flanges, which are usually extensions of the various upright surfaces of the liner, serve to prevent damage to the truck bed rails which take the form of chips, scratches or dents. This damage often occurs when, for example, heavy objects being lifted and placed into the truck are set on these rails and then tumbled into the cargo bed.

While functioning to help protect the truck bed rails from avoidable and excessive damage, existing truck bed liner flanges suffer from several serious shortcomings including scuffing of the truck and warpage. Although bed liners often improve the aesthetic appearance of a truck, there are occasions when removal of the cargo bed liner is desired or necessitated. On such occasions, vehicle owners often discover to their dismay that the flanges which overlay the top rails have actually scratched and scuffed the very surfaces for which the flanges were specifically designed to protect. This type of scuffing along the top rails is especially undesirable for a variety of reasons. While truck cargo beds are typically expected to be damaged through normal usage, and therefore some scuffing of the cargo bed interior by the liner is not overly devastating, unsightly damage to the top rails suggests the trucks have been subject to improper treatment and may translate to lower truck resale values. Furthermore, the fact that many persons perceive the top rails as being outside the cargo bed and not subject to damage from use makes scuffing along these top rails all the more noticeable. Moreover, the scuffing of the top rail makes the top rail more susceptible to corrosion which is readily visible by casual observers.

Because vibrations and other normal operating motions of the vehicle cause the liner to move relative to the cargo bed, undesirable scuffing of the top rail inevitably occurs each place where the liner flange contacts and rubs against the top rail. The presence of foreign particles at the contact points between the liner and the top rail only compounds the scuffing damage to the rail. Despite this fact, cargo bed liners which utilize horizontal flanges that overlay the top rail wherein substantially the entire width of the top rail is contacted by the flange are well known in the art. For instance, U.S. Pat. No. 4,906,040 discloses a liner flange flush with the top surface of the truck bed wall. This configuration subjects virtually the entire area of the top surface to scuffing. In addition to overlaying and being flush with the top rail, other liner flanges, for instance as shown overlaying a top rail of a cargo bed side wall in U.S. Pat. No. 5,046,775 and a top rail of a tailgate in U.S. Pat. No. 5,000,503, hook over the top rail and terminate with a downward projecting lip against the outer surface of the truck wall. These designs not only can scuff the entire top rail, but also scratch the vehicle's finish where the lip contacts the outer panels of the truck. This damage is even more noticeable and unacceptable than damage merely to the top rail.

Other models of liner flanges which overlay and protect the top rail exist that do not contact substantially all of the top rail. For example, U.S. Pat. No. 4,595,229 and 4,750,776 each disclose horizontal liner flanges which are generally spaced apart from the top rails which they protect. Each flange terminates in a downwardly extending lip which abuts the top rail. U.S. Pat. No. 4,047,749 discloses a horizontal liner flange, overlaying the inner portion of a truck bed top rail, which includes a recess of a height less than the thickness of the liner to receive double sided tape and which terminates with a downwardly extending lip contacting the top rail. While these liner flange designs reduce the contact areas between the top rail and the liner and thereby decrease the area susceptible to scuffing, they create a different problem as an undesirable side effect. These designs ensure that very deep scratches and scuffs, although in a more isolated location than some other flanges, will result in the top rail. This effect occurs because the portion of the top rail contacting the liner flange lip bears the entire load applied to the liner flange. A broader area of contact is lacking to aid in dissipating the loading forces applied and thereby lessen the severity of the scratches.

In addition to the shortcoming of causing scuffing, truck bed liner flanges also tend to warp over time. When first purchased and installed in cargo beds, most existing horizontal liner flanges fit neatly against the truck top rails and contribute to the sleek appearance of the vehicle. However, repeated exposure to the elements or hot weather frequently causes the flanges to eventually warp and become wavy or undulating, resulting in relatively large gaps or spaces appearing between the liner flanges and the top rails of the vehicle. Besides detracting from the overall appearance of the vehicle, these gaps also allow more contaminants such as dirt or salt to enter between the truck bed liner and cargo bed, thereby increasing the likelihood of both scuffing damage and corrosion occurring in the truck cargo bed.

OBJECTS OF THE INVENTION

Accordingly, one object of the present invention is to provide a vehicle bed liner having a top rail protecting flange with an improved surface area contacting the top rail, thereby decreasing the amount of scuffing to the finish of the vehicle.

Another object of the present invention is to provide a vehicle bed liner having a top rail protecting flange with means to substantially prevent the flange from contacting the top rail, thereby virtually eliminating all scuffing to the top rail.

Another object of the present invention is to provide a vehicle bed liner having a top rail protecting flange which improves the aesthetic appearance of the vehicle in which it is installed while reducing scuffing to the top rail.

Another object of the present invention is to provide a vehicle bed liner having a top rail protecting flange with an improved resistance to warpage, thereby maintaining the sleek and attractive appearance of the vehicle in which the liner is mounted.

A still further object of the present invention is to provide a vehicle bed liner having a top rail protecting flange with an improved resistance to warpage, thereby preventing gaps from forming between the liner and the top rail which allow foreign objects to enter between the liner and the cargo bed which compound the scuffing and potential corrosion of the cargo bed.

SUMMARY OF THE INVENTION

In one form thereof, the truck bed liner with rail protection of the present invention is designed for use with a truck cargo bed having at least one vertical wall with a generally horizontal top rail and comprises an upright surface, which substantially covers the vertical wall of the cargo bed, and a rail protector. The rail protector, integral with the upright surface, substantially covers the top rail and comprises an upper portion, a lower portion, and a connecting portion. The upper portion extends generally outwardly away from the cargo bed and is proximate with the upright surface and positioned with respect to the upright surface so as to be spaced from the top rail of the vertical wall. The lower portion, generally horizontal and outwardly extending, is positioned with respect to the upright surface so as to be substantially flush with the top rail of the vertical wall. A vertically extending connecting portion connects the upper and lower portions and provides increased warpage resistance to the invention. A resilient, load-bearing foam member, positioned inward of the vertically extending connecting portion, contacts the underside of the rail protector and assists in maintaining the lower portion of the rail protector away from the top rail, reducing scuffing and damage thereto.

In another form of the invention, a rigid reinforcing plate replaces the foam member. The plate comprises an upper surface, which contacts the underside of the upper portion of the rail protector, and a lower surface having attached thereto a resilient load-bearing foam member positioned to abut the top rail. The reinforcing plate is positioned to span a stake pocket of the top rail and, through the use of securing means such as a toggle bolt, secures the liner to the top rail.

In still another form thereof, the rail protector of the present invention comprises a generally horizontal and outwardly extending ridged flange integral with the upright wall covering surface and positioned to cover a top rail of the upright wall of a vehicle cargo bed. The ridged flange includes at least one transversely extending ridge, which has inward and outward substantially vertical sides and which is located outward of the upright wall covering surface. The flange also includes an outwardly extending end portion, located at the bottom of the outward side of the most outward transversely extending ridge, which is positioned to be substantially flush with the top rail of the upright wall.

DETAILED DESCRIPTION

Figure 1:
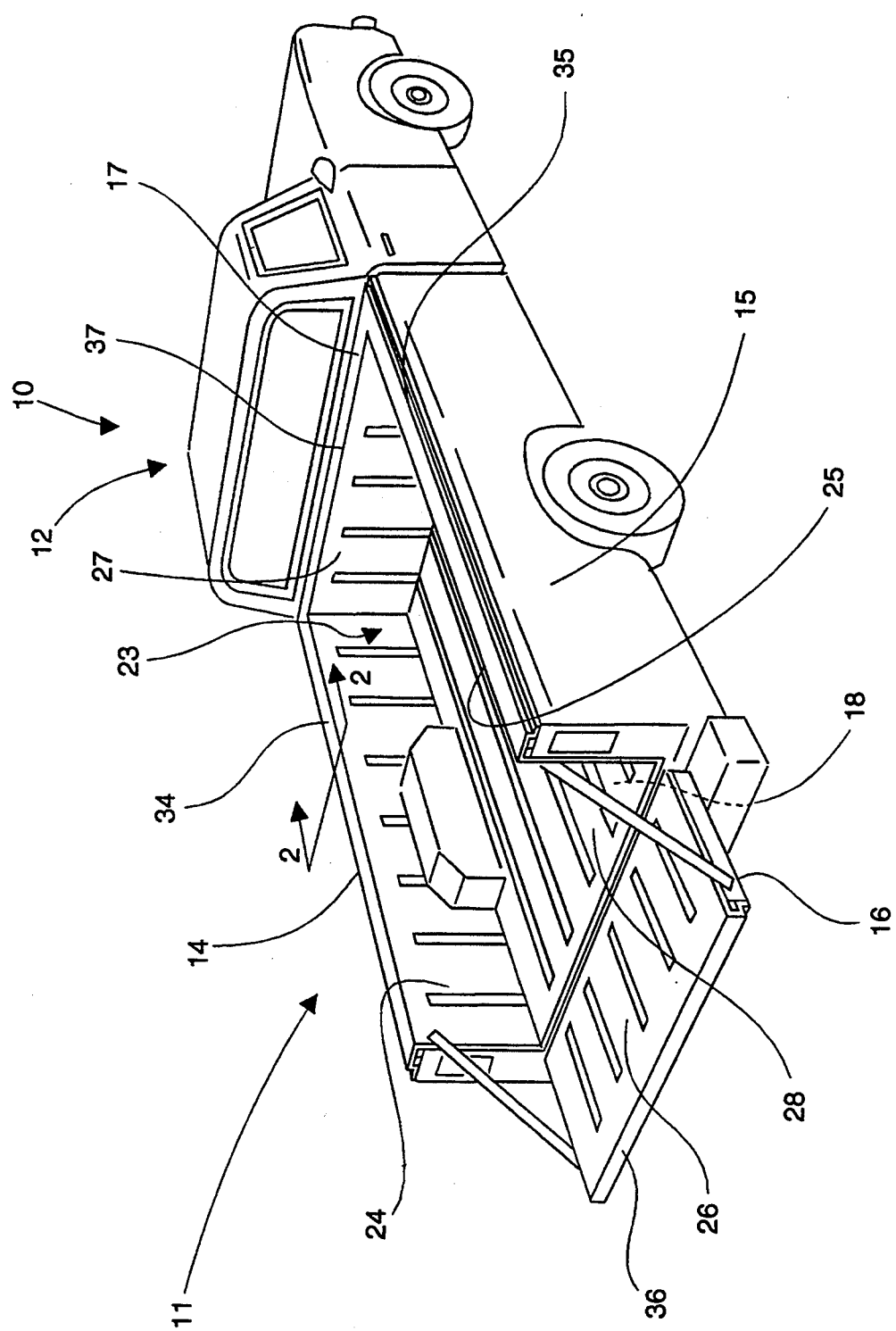
FIG. 1 shows a perspective view of one embodiment of the truck bed liner with rail protection of the present invention installed in the cargo bed of a typical pickup truck.

Referring now to FIG. 1, there is shown a perspective view of a standard pickup truck 10 which includes cargo bed 11 and passenger cab 12. As is well known in the art, the lateral boundaries of cargo bed 11 are generally defined by opposing vertical side walls 14, 15, forward vertical wall 17 immediately behind and adjacent passenger cab 12, and rear wall or tailgate 16 (shown in a horizontal, open orientation as opposed to a vertical, closed orientation). The inward surfaces or sides of each of these upright walls 14, 15, 16, 17, depending on whether the walls are of single or double wall construction respectively, together with floor 18, define the rectangular shaped compartment used for hauling cargo. As more clearly illustrated in the cross-sectional view of FIG. 2, upright side wall 14 is of a single wall construction and includes at its upper extreme top rail 20, which ends with an inwardly located downward extension 21. Top rail 20 is generally horizontal and extends the length of side wall 14. Upright walls 15, 16, 17 similarly include a generally horizontal top rail. In addition to being of different lengths, top rails of upright walls 16 and 17 may also be of different width than top rail 20. Nonetheless, the invention can be adapted to, or more accurately, formed to accommodate, nearly any width of top rail. For instance, if the tailgate top rail is of lesser width than the top rail of the cargo bed side wall, the rail protector can be scaled down proportionately or more likely be shortened in the outward direction appropriately. The mold used to custom manufacture cargo bed liners with rail protectors of the present invention for a given vehicle model will account for the various widths of the top rails of the model. Moreover, for any truck design which employs a slightly different top rail construction that is not exactly flat or generally horizontal, corresponding minor variations in the design of the rail protector which account for these differences are considered within the scope of the invention.

Again referencing FIG. 1, installed in pickup truck 10 is a custom fit cargo bed liner 23 which employs one embodiment of the top rail protector of the present invention. As is well known in the art, liner 23 may be vacuum formed from a single piece of thermoplastic having a substantially uniform thickness. Liner 23 is shown to include upright side surfaces 24, 25, forward upright surface 27, rearward surface 26, and bottom surface 28, which respectively cover the four interior walls and floor of cargo bed 11. Each upright surface 24, 25, 27, as well as rearward surface 26 which is upright when tailgate 16 is closed, terminates and is integral with a generally horizontal flange or rail protector 34, 35, 36, 37 which covers or overlays and protects the top rails of truck 10. It will be appreciated by those of skill in the art that liner 23 need not cover all the walls and bottom of cargo bed 11 in order for the rail protector invention to perform properly. In fact, if desired, it is not even necessary for liner 23 to cover any of the walls. Rather, the invention merely requires liner 23 to either include an upright surface which is integral with the rail protector invention, or include a means to secure the rail protectors independently to the top rails.

Figure 2:
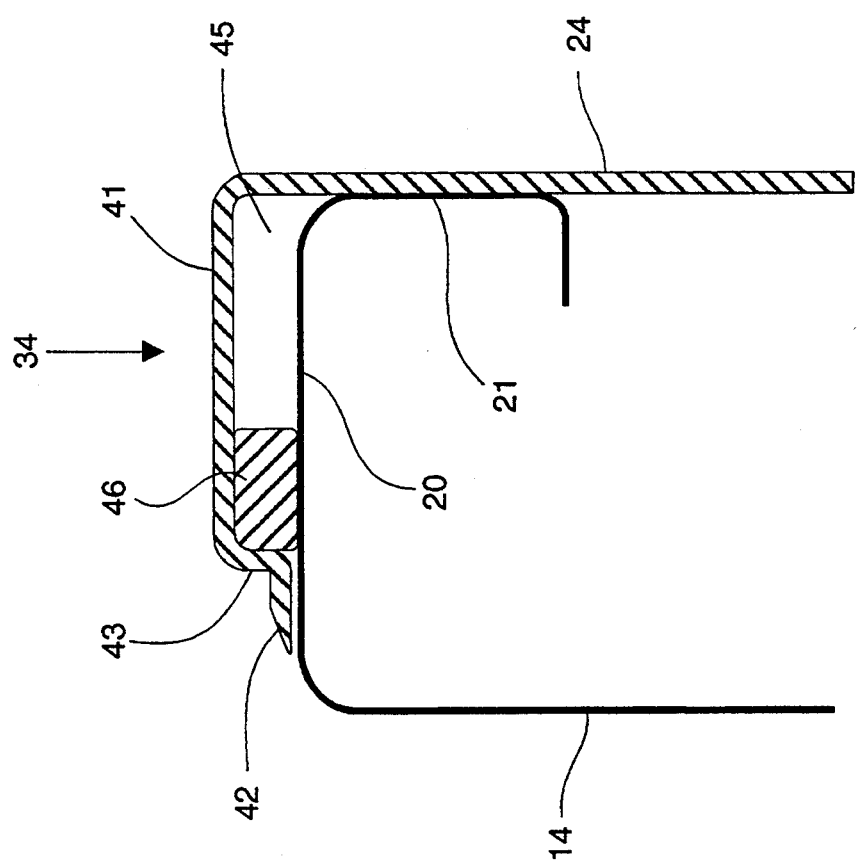
FIG. 2 shows a cross-sectional view from FIG. 1 of one embodiment of the rail protector of the present invention covering a top rail of a cargo bed wall.

Referring now to FIG. 2, there is shown a cross-sectional view of the rail protector embodiment of the present invention illustrated in FIG. 1. Upright surface 24 of cargo bed liner 23, which covers the inward or interior surface of side wall 14 and is adjacent to downward extension 21, is formed integral with a rail protector, generally designated 34. Rail protector 34, which extends the length of top rail 20 and side wall 14 as shown in FIG. 1, substantially covers the narrow width of top rail 20 and comprises upper portion 41, lower portion 42, and connecting portion 43.

Upper portion 41, located proximate and approximately perpendicular to upright surface 24, extends generally horizontally and outwardly away from cargo bed 11. In this embodiment, the bending junction between upright surface 24 and upper portion 41 occurs at a height above the horizontal plane of top rail 20. The height of the junction relative to top rail 20, coupled with the horizontal orientation of both upper portion 41 and top rail 20, results in upper portion 41 being positioned with respect to upright surface 24 so as to be spaced from top rail 20. As different vehicle models have cargo beds of different depth, the height of upright surface 24 and orientation or shape of upper portion 41 of liner 23 may differ from the embodiment shown. However, important to the invention performing ideally is that upright surface 24 and upper portion 41 cooperate to provide a spaced apart relationship between upper portion 41 and top rail 20.

At the outward extreme of rail protector 34 is a generally horizontally and outwardly extending lower portion 42, which is positioned with respect to upright surface 24 so as to be substantially flush with top rail 20. Lower portion 42 tapers outwardly in thickness, thereby having a lesser mass toward the outward extent of top rail 20. This lessened mass, which minimizes potential scuffing of top rail 20 resulting from contact with lower portion 42, does not hinder the performance of lower portion 42, which still provides protective cover to prevent external forces or objects from directly contacting rail 20. Upper portion 41 and lower portion 42 are joined by vertically extending connecting portion 43. Formed to be of a height greater than the thickness of upper portion 41 or lower portion 42, connecting portion 43 forms the outward limit of recess 45. Recess 45 is a volume of space created between rail protector 34 and top rail 20 of truck 10 when liner 23 is installed in cargo bed 11. In this embodiment, recess 45 is of rectangular cross-section, defined by connecting portion 43, upper portion 41, top rail 20, and that part of upright surface 24 which is adjacent upper portion 41 and above the plane of top rail 20. Upper portion 41 does not need to be flat nor horizontal to protect top rail 20 or to promote the beneficial anti-warpage properties of the invention. In order to promote improved warpage resistance, upper portion 41 merely needs to meet with connecting portion 43 at a height above lower portion 42 which is greater than the thickness of upper portion 41. As a result, depending on the appearance of rail protector 34 desired by the operator of truck 10, upper portion 41 can be constructed in any number of ways with the effect of producing recess 45 of a cross-sectional triangular shape, trapezoidal shape, or other shapes having a curved or undulating portion.

Positioned inward of vertically extending connecting portion 43 and contacting rail protector 34 within recess 45 is a resilient, load bearing foam member 46. In this embodiment, foam member 46 is comprised of foam tape and extends the entire length of rail protector 34. In FIG. 2, foam member 46 is positioned adjacent and abutting connecting portion 43 and is adhesively connected to the underside of upper portion 41. In its natural state, foam member 46 is of greater thickness than the height difference between the undersides of upper portion 41 and lower portion 42. Moreover, foam member 46 is selected to be of a sufficient thickness and rigidity such that unless external loads are directly applied to rail protector 34, foam member 46 maintains lower portion 42 substantially flush with top rail 20. As a result, when liner 23 is initially installed in cargo bed 11, a slight gap exists between lower portion 42 and top rail 20. Because this gap exists, the constant contact area between the rigid plastic rail protector 34 and top rail 20 is all but eliminated and incidental scuffing is thereby reduced. When large external loads are applied to rail protector 34, foam member 46 is compressed while absorbing some of the load and lower portion 42 comes into contact with top rail 20 and transfers the load thereto. The enlarged contact area of lower portion 42 distributes the external loading forces over a relatively large area of top rail 20, reducing the likelihood of deep scratches marring the finish of top rail 20.

In addition to reducing the contact points between rail protector 34 and top rail 20, foam member 46 better conforms to the shape of top rail 20 and serves the ancillary beneficial function of hindering contaminants from entering between liner 23 and the surfaces of cargo bed 11 which could cause scuffing and corrosion. Foam member 46 has been placed inward of connecting portion 43, rather than under lower portion 42 where it could eliminate top rail contact with rail protector 34, for two reasons. First, foam member 46 is removed from sight, thereby not detracting from the sleek and attractive appearance of liner 23 within cargo bed 11. Second, the painstaking precision which would be necessary to properly mount foam member 46 on the narrow width of lower portion 42, a width nonetheless large enough to distribute loading forces applied to rail protector 34, is alleviated. The benefits of these two reasons serve to outweigh the drawback of possible limited and isolated scuffing to top rail 20 by lower portion 42.

Figure 3:
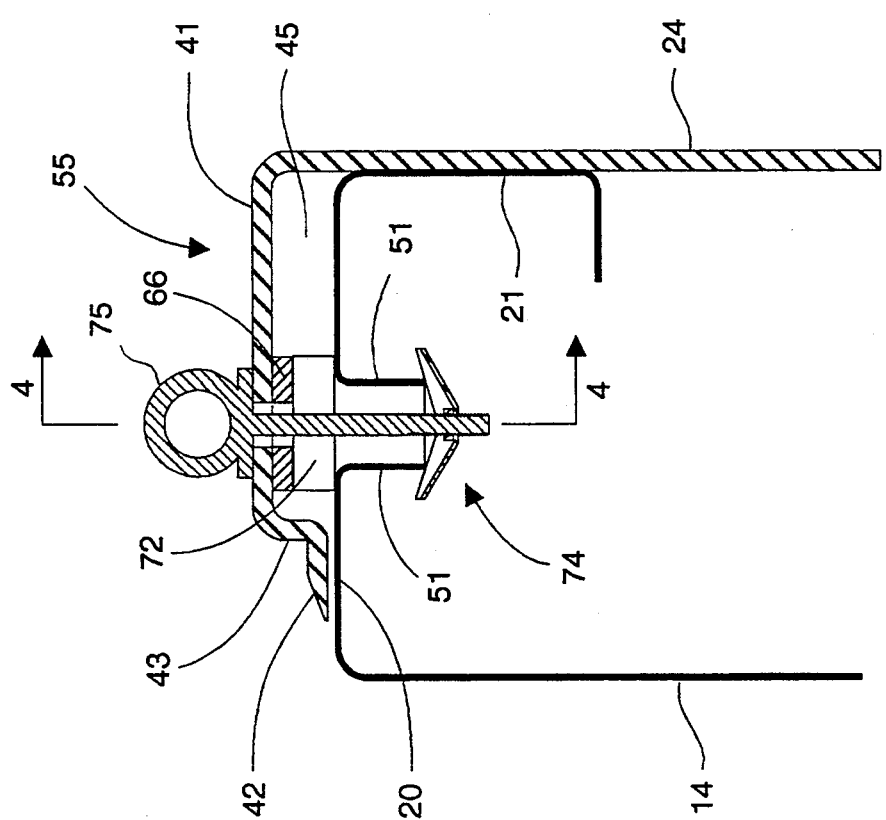
FIG. 3 shows a cross-sectional view of a second embodiment of the present invention in which a reinforcing plate spans a stake pocket and assists in securing the liner to the top rail.
Figure 4:
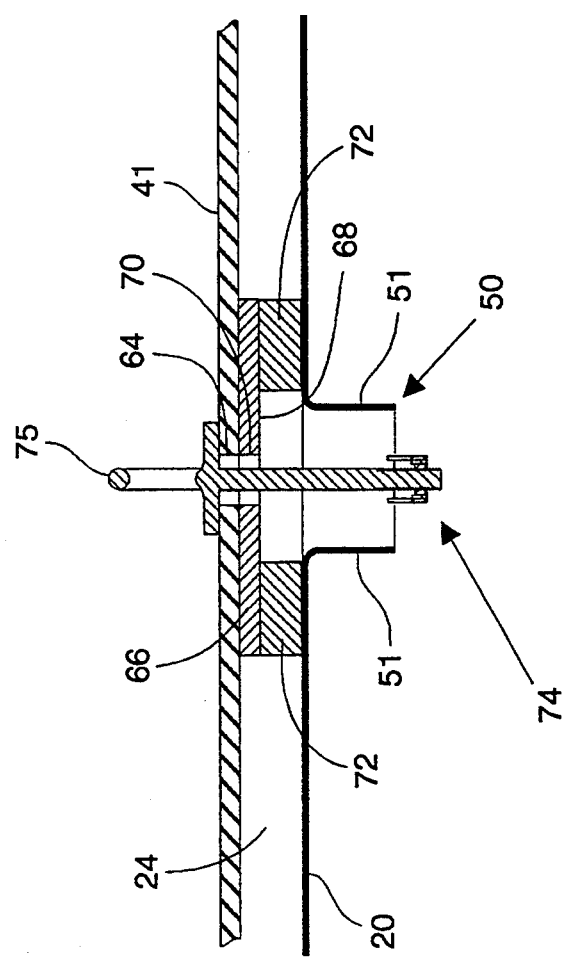
FIG. 4 shows a cross-sectional view taken along line 4—4 in FIG. 3, where a quarter portion of the embodiment removed for sectional illustration purposes in FIG. 3 is now shown.
Figure 5:
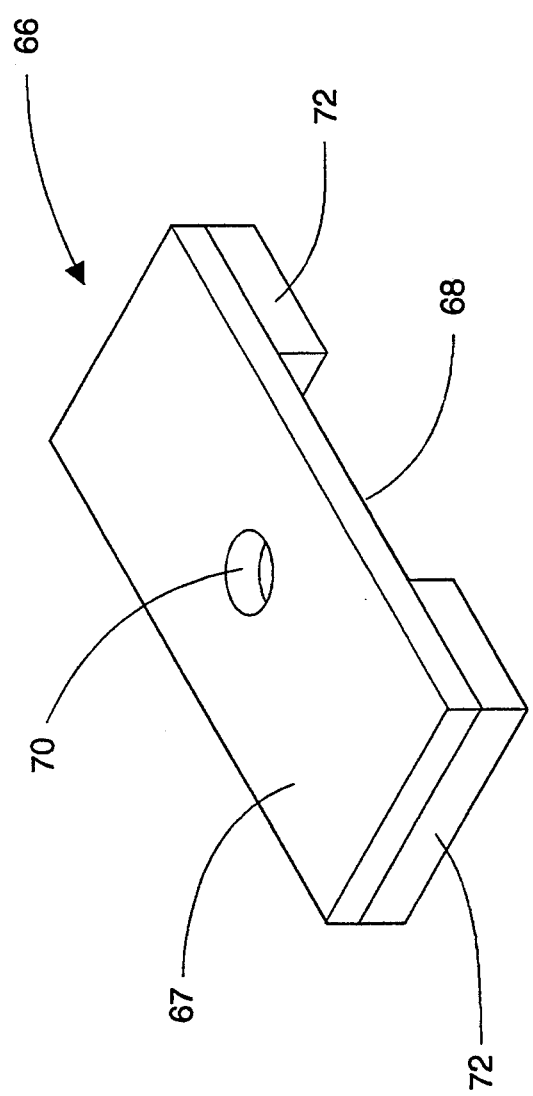
FIG. 5 shows a perspective view of the reinforcing plate used in the embodiment of the invention shown in FIG. 3.

Referring now to FIGS. 3-5, there is shown another embodiment of the rail protector of the present invention which is specially designed to be used in conjunction with stake pockets. As is well known in the art, the top rails of cargo bed vertical walls often include stake pockets or holes used in the tying down or securing of cargo within cargo bed 11, or to secure a camper top thereto. As shown in FIGS. 3 and 4, rectangular stake pocket 50, having four downwardly directed sides 51, is formed in top rail 20 of side wall 14. Upright surface 24 of cargo bed liner 23, which covers the inward or interior portion of side wall 14, is formed integral with a rail protector, designated 55 in this embodiment. Rail protector 55, with respect to the configuration of liner 23, is nearly structurally identical to rail protector 34 and therefore is similarly numbered. Specifically, rail protector 55 substantially covers the width of top rail 20 and comprises upper portion 41, lower portion 42, and connecting portion 43. Upper portion 41, located proximate and approximately perpendicular to upright surface 24, extends generally horizontally and outwardly away from cargo bed 11. Upper portion 41 is positioned with respect to upright surface 24 so as to be spaced from top rail 20. At the outward extreme of rail protector 55 is a generally horizontally and outwardly extending lower portion 42, which is positioned with respect to upright surface 24 so as to be substantially flush with top rail 20. Lower portion 42 tapers outwardly in thickness. Upper portion 41 and lower portion 42 are joined by vertically extending connecting portion 43. Formed to be of a height greater than the thickness of upper portion 41 or lower portion 42, connecting portion 43 forms the outward limit of recess 45. In this embodiment, recess 45 is of rectangular cross-section, defined by connecting portion 43, upper portion 41, top rail 20, and that part of upright surface 24 which is adjacent upper portion 41 and above the plane of top rail 20.

Rail protector 55 is secured to top rail 20 by an assembly which employs toggle bolt 74 and a rectangular shaped rigid reinforcing plate 66 having upper surface 67, lower surface 68, and hole 70 passing therethrough. This assembly could be included with the installation kit for liner 23. Reinforcing plate 66 includes an upper surface 67 which contacts the underside of upper portion 41 when installed. On lower surface 68 of plate 66 at each short-side end is attached a resilient, load bearing foam member 72. Foam members 72, which as best shown in FIG. 4 abut top rail 20 when plate 66 spans stake pocket 50, serve as the contact points between rail protector 55 and top rail 20. Fabricated from plastic or other rigid material in a 1.25×3.00×0.300 inch size, reinforcing plate 66 has long sides of greater length than stake pocket 50. Of course, as different vehicle models may utilize stake pockets having different sizes, the size of plate 66 may vary between vehicles.

The assembly functions to tightly secure rail protector 55 to top rail 20 in the following manner. While liner 23 is not inserted in cargo bed 11, or after raising liner 23 within cargo bed 11, plate 66 is first positioned to span stake pocket 50. Then, when liner 23 is moved to its custom fit location, plate 66 is received within recess 45. Hole 64 prefabricated in upper portion 41 will be aligned with hole 70 of plate 66, which is oriented above stake pocket 50. At this time, toggle bolt 74 can first be inserted into the aligned holes and extended through upper portion 41, plate 66, and stake pocket 50 to engage the bottom of sides 51 of stake pocket 50. Tightening of toggle bolt 74 then compresses foam members 72 and forces together rail protector 55 and top rail 20. In this manner, liner 23 is effectively secured to top rail 20. Plate 66 and foam members 72 are preferably of a thickness and rigidity such that after being tightened down, lower portion 42 is substantially flush with top rail 20. Toggle bolt 74 is shown with looped extension 75 to which bungee cords or ropes can readily be fastened to secure cargo within cargo bed 11.

Figure 6:
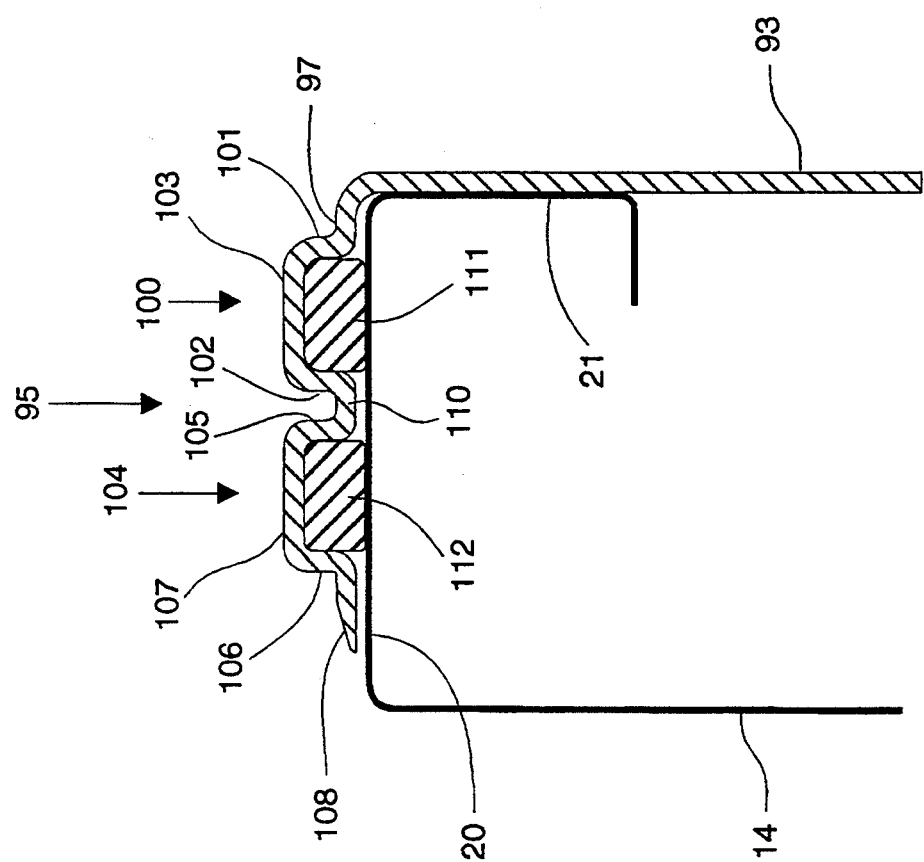
FIG. 6 shows a cross-sectional view of a third embodiment of the present invention overlaying a top rail of a cargo bed wall.
Figure 7:
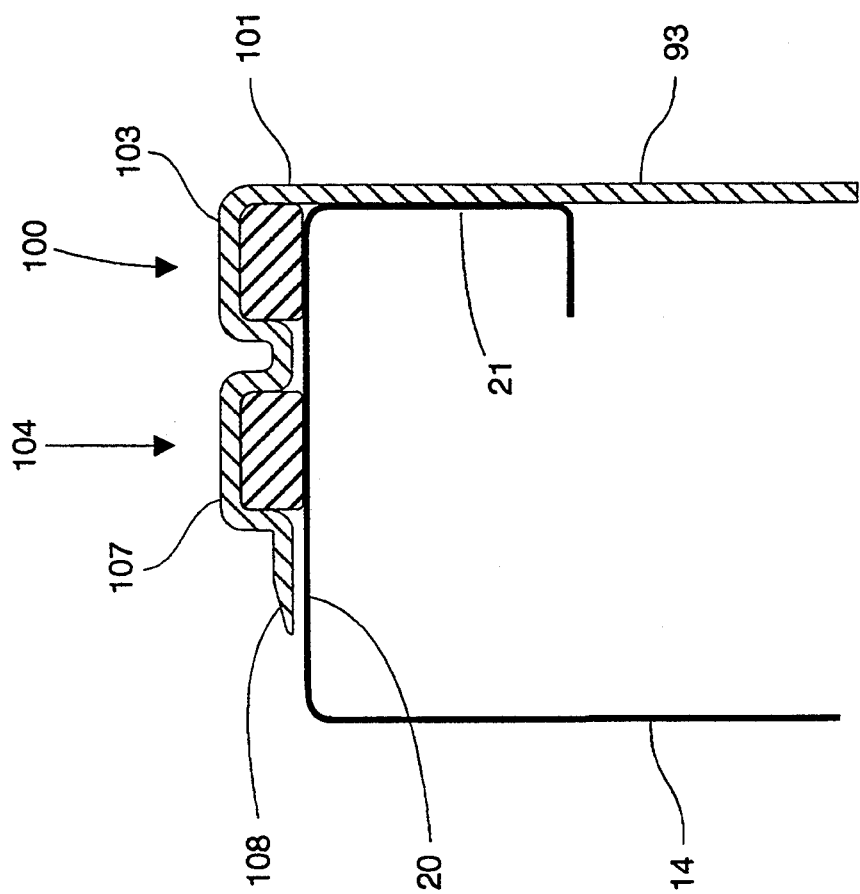
FIG. 7 shows a cross-sectional view of a fourth embodiment of the present invention overlaying a top rail of a cargo bed wall.

Two additional alternate embodiments of rail protectors of the present invention are illustrated in FIGS. 6 and 7. In FIG. 6, there is shown a cross-sectional view of rail protector 95 installed on a typical upright or vertical cargo bed wall such as side wall 14. As previously described, upright wall 14 includes at its upper extreme a generally horizontally disposed top rail 20, which ends with downward extension 21.

Upright wall covering surface 93 is integral with rail protector 95. Rail protector 95, more particularly described as a ridged flange, is generally horizontal and outwardly extends away from cargo bed 11. As shown in the cross-sectional view of the outwardly extending width of flange 95 in FIG. 6, flange 95 includes a horizontal joint portion 97, first ridge 100, second ridge 104, intermediate member 110, and end portion 108. Joint portion 97 is outward of and adjacent upright wall covering surface 93. First ridge 100 and second ridge 104 are inverted U-shaped ridges which transversely extend the length of flange 95. More specifically, ridges 100, 104 are parallel to upright wall covering surface 93. Ridges 100, 104 each include an inward substantially vertical side 101, 105, an outward substantially vertical side 102, 106, and a horizontal peak 103, 107 respectively. Horizontal intermediate portion 110 connects outward side 102 of first ridge 100 with inward side 105 of second ridge 104. End portion 108 begins at the bottom of outward side 106 of ridge 104, which is the most outward transversely extending ridge, and tapers outwardly in thickness. In this embodiment, a first resilient load-bearing foam member 111 is located intermediate inward side 101 and outward side 102 of ridge 100, and a second resilient load-bearing foam member 112 is located intermediate inward side 105 and outward side 106 of ridge 104. Foam members 111, 112, which are comprised of foam tape adhesively connected to the undersides of horizontal peaks 103, 107 respectively, maintain end portion 108, intermediate portion 110, and joint portion 97 substantially flush with top rail 20 in a manner similar to that described with respect to lower portion 42 of FIG. 2.

The rail protector illustrated in FIG. 7 is identical to the embodiment illustrated in FIG. 6 except for one modification, and therefore corresponding parts are correspondingly numbered. The sole difference pertains to the lack of joint portion 97 in the invention embodied in FIG. 7. Instead of bending to overlay the inner edge of top rail 20, upright surface 93 continues vertically to extend above the plane of top rail 20. This vertical extension forms inward side 101 of first ridge 100. It will be appreciated by those of skill in the art that the embodiments of FIG. 6 and FIG. 7 are advantageous for a number of reasons. Specifically, the increased number of heightened vertical edges or ridge sides prevents warpage. Also, the provision of multiple foam members means that greater amounts of external loading to the rail protector can be absorbed by the foam members before the rail protector is forced down to contact the top rail, thereby reducing the likelihood of scuffing thereto. And, the grooved appearance resulting from the ridges may well be considered aesthetically pleasing. Other ridged flanges having different numbers and shapes of ridges than those disclosed in FIGS. 6 and 7 and which still provide these beneficial warpage resistance or non-scuff characteristics are feasible and should be considered within the scope of the invention.

As is evident from the foregoing disclosure, the present invention provides a vehicle bed liner having an improved rail protector which overlays and protects the top rail of a vehicle. As the rail protector is normally spaced apart from the top rail to reduce contact therebetween, scuffing or scratching to the top rail is greatly reduced. The use of resilient foam members independently, or in conjunction with the reinforcing plate, further maintains the unloaded rail protector away from contact with the top rail and thereby virtually eliminates all scuffing thereto. Moreover, to afford better protection to the finish of the top rail when loads are directly applied to the rail protector, the invention provides a contact portion at the outward end of the rail protector with an enlarged surface area to distribute the loading forces. As a result, the severity of any scuffing to the top rail where the top rail and flange do actually contact is minimized. The multileveled rail protector also enhances the attractive appearance of the liner.

Besides decreasing the likelihood of scuffing to the top rail, the multileveled outwardly extending rail protector exhibits another advantageous feature, namely warpage resistance. Because the vertically extending connecting portion or ridge sides of the rail protector increases the effective thickness in height of the rail protector, the rail protector is less prone to warp along its length. For example, with respect to a rail protector mounted on the side wall of a cargo bed, the invention is less likely to warp and appear undulating from the perspective of a viewer located to the side of the truck. Moreover, because the rail protector effective thickness is increased without making the rail protector uniformly thicker, the cost of decreased warpage is minimized. The absence of undulation in the rail protectors resulting from their resistance to warpage, in addition to maintaining the attractive appearance of the vehicle, translates to smaller gaps between the liner and the cargo bed. Foreign objects which compound the scuffing and potential corrosion of the cargo bed therefore enter less easily between the liner and the cargo bed.

What is claimed is:

1. A vehicle bed liner, for use with vehicle cargo beds comprising at least one vertical wall, the vertical wall having a generally horizontal top rail, the liner comprising:
    an upright surface which substantially covers the vertical wall of the cargo bed;
    a rail protector, integral with the upright surface and which substantially covers the top rail, comprising,
        an upper portion extending generally outwardly from the cargo bed, the upper portion comprising an upper surface and a lower surface which define a thickness therebetween, the upper portion disposed outward of the upright surface and positioned with respect to the upright surface so as to be spaced from the top rail of the vertical wall,
        a generally horizontal and outwardly extending lower portion comprising an upper surface and a lower surface, wherein the lower portion is positioned with respect to the upright surface such that the lower portion lower surface is spaced from the top rail of the vertical wall,
        a vertically extending connecting portion connecting the upper and lower portions, the connection portion having an inward surface, an outward surface, and a height greater than the thickness of the upper portions,
        wherein the lower portion extends outwardly beyond the outward surface of the connecting portion, and
        a resilient, load-bearing foam member contacting the rail protector and positioned inward of the inward surface of the vertically extending connecting portion.

2. The vehicle bed liner of claim 1 wherein the lower portion outwardly tapers in thickness.

3. The vehicle bed liner of claim 1 wherein the foam member is adhesively connected to the upper portion.

4. The vehicle bed liner of claim 3 wherein the lower portion outwardly tapers in thickness.

5. A vehicle bed liner, for use with vehicle cargo beds comprising at least one vertical wall, the vertical wall having a generally horizontal top rail with at least one stake pocket formed therein, the liner comprising:
    an upright surface which substantially covers the vertical wall of the cargo bed;
    a rail protector integral with the upright surface and which substantially covers the top rail, the rail protector comprising,
        an upper portion extending generally outward from the cargo bed, the upper portion disposed outward of the upright surface and being positioned with respect to the upright surface so as to be spaced from the top rail of the vertical wall,
        a generally horizontal and outwardly extending lower portion comprising an upper surface and a lower surface, wherein the lower portion is positioned with respect to the upright surface such that the lower portion lower surface is spaced from the top rail of the vertical wall,
        a vertically extending connecting portion connecting the upper and lower portions, the connection portion having an inward surface and an outward surface,
        wherein the lower portion extends outwardly beyond the outward surface of the connecting portion;
    a rigid reinforcing plate having an upper surface which contacts the upper portion, the reinforcing plate having a lower surface having attached thereto a resilient load-bearing foam member positioned to abut the top rail, the reinforcing plate being positioned to span the at least one stake pocket of the top rail.

6. The vehicle bed liner of claim 5 further comprising securing means extending through the upper portion, reinforcing plate and stake pocket to thereby secure the liner to the top rail.

7. The vehicle bed liner of claim 6 wherein the securing means comprises a toggle bolt.

8. A vehicle bed liner, for use with vehicles having a cargo bed comprising a plurality of upright walls, the liner comprising:
    an upright wall covering surface, a generally horizontal and outwardly extending ridged flange integral with the upright wall covering surface and positioned to cover a top rail of the upright wall of a vehicle cargo bed, wherein the ridged flange includes a first transversely extending ridge having inward and outward substantially vertical sides, each vertical side having an inward surface and an outward surface, the first ridge being located outward of the upright wall covering surface, and an outwardly extending end portion located at the bottom of the outward side of the first ridge and extending outwardly beyond the outward surface of the outward side of the first, the end portion comprising an upper surface and a lower surface, wherein the end portion is positioned such that the end portion lower surface is spaced from the top rail of the upright wall.

9. The vehicle bed liner of claim 8 wherein the end portion outwardly tapers in thickness.

10. The vehicle bed liner of claim 8 further comprising a resilient, load-bearing foam member intermediate the inward and outward substantially vertical sides of the first transversely extending ridge.

11. The vehicle bed liner of claim 8, wherein the ridged flange further comprises a second transversely extending ridge having inward and outward substantially vertical sides, each vertical side having an inward surface and an outward surface, the second ridge being located outward of the upright wall covering surface and inward of the first transversely extending ridge.

12. The vehicle bed liner of claim 11, further comprising:

a first resilient, load-bearing foam member intermediate the inward and outward substantially vertical sides of the first transversely extending ridge; and a second resilient, load-bearing foam member intermediate the inward and outward substantially vertical sides of the second transversely extending ridge.

* * * * *